United States Patent
Dorren (10) Patent No.: US 6,636,043 B1
(45) Date of Patent: Oct. 21, 2003

(54) VARIABLE RESOLUTION VECTOR POSITIONAL DISPLAY FOR USE WITH AN UNDERGROUND OBJECT LOCATING SYSTEM

(75) Inventor: Louis Dorren, Millbrae, CA (US)

(73) Assignee: Geometrics Group, Inc., San Jose, CA (US)

( * ) Notice: Subject to any disclaimer, the term of this patent is extended or adjusted under 35 U.S.C. 154(b) by 0 days.

(21) Appl. No.: 09/948,520

(22) Filed: Sep. 7, 2001

Related U.S. Application Data (60) Provisional application No. 60/231,200, filed on Sep. 7, 2000.

(51) Int. Cl.[7] .............................. G01V 3/08; G01V 3/165
(52) U.S. Cl. ......................................... 324/326; 324/67
(58) Field of Search .......................... 324/67, 326, 329, 324/334–337; 342/22, 417–419, 443, 459; 455/41

(56) References Cited

U.S. PATENT DOCUMENTS

| | | | | |
|---|---|---|---|---|
| 4,263,552 A | * | 4/1981 | Weber | 324/326 |
| 4,551,727 A | * | 11/1985 | Cunningham | 342/418 |
| 4,698,634 A | * | 10/1987 | Alongi et al. | 324/337 X |
| 4,709,213 A | * | 11/1987 | Podhrasky | 324/329 |
| 4,992,741 A | * | 2/1991 | Douglas et al. | 324/67 X |
| 5,001,430 A | * | 3/1991 | Peterman et al. | 324/326 |
| 5,438,266 A | * | 8/1995 | Tsang | 324/326 |
| 5,592,092 A | * | 1/1997 | Mechler | 324/326 |
| 5,917,314 A | * | 6/1999 | Heger et al. | 324/67 |
| 6,211,807 B1 | * | 4/2001 | Wilkison | 342/22 |

* cited by examiner

Primary Examiner—Gerard R. Strecker
(74) Attorney, Agent, or Firm—Beyer Weaver & Thomas, LLP (57) ABSTRACT

A vector positional display for use in an underground metal locating system for indicating the relative position of the underground metal with respect to a sensor array. The underground object functions as a RF transmitter, and the antenna array detects the transmitted signal. Commutation of the antenna array causes frequency modulation of the received signal which after demodulation can be used for identifying the direction of the object from the sensor array. A display slot counter accumulates count from a system clock, and resolution decoders determine field of view from the antenna array in locating the object. A zero crossing data probe triggers a display decoder which converts accumulated count to a format for energizing lights in the display unit.

8 Claims, 7 Drawing Sheets

VARIABLE RESOLUTION VECTOR POSITIONAL DISPLAY FOR USE WITH AN UNDERGROUND OBJECT LOCATING SYSTEM

CROSS-REFERENCES TO RELATED APPLICATIONS

This application claims priority from provisional application serial No. 60/231,200, filed Sep. 7, 2000, and is related to application Ser. No. 09/734,963, filed Dec. 11, 2000, now U.S. Pat. No. 6,541,976, for Under and Above Ground, Radio Frequency Driven Element, Metal Locating System and application Ser. No. 09/948,519, filed concurrently herewith on Sep. 7, 2001, for Under and Above Ground, Radio Frequency Driven Element, Metal Locating System, the disclosures of which are incorporated herein by reference for all purposes.

BACKGROUND OF THE INVENTION

This invention relates generally to metal detection apparatus, and more particularly the invention relates to a system which detects signals emitted from a metal object such as an underground pipe and particularly to a vector positional display for use therein.

In the construction and utility maintenance fields, the ability to trace underground metal and underground piping has been a needed requirement for both safety and maintenance purposes. Currently available equipment to do this job uses very low frequency systems for detection and tracing. These frequencies may start at 1 kHz and go up as high as 490 kHz.

The ability to detect and trace underground piping is greatly affected by the environment that exists at the time of detection. If the ground is very wet or is made of different combinations of earth, erroneous results may occur. If the underground pipe or metal contains an insulating gasket, this may limit the distance at which the pipe can be traced due to the gasket acting like a very low value capacitor. This capacitor is a high impedance to the very low frequency signals, thus preventing them from jumping across the gasket. In addition, the ability to couple the low frequency energy to the underground metal or pipe becomes very difficult. The extreme low frequency makes necessary a very high voltage for the pipe to emit enough signal to be detected.

Various types of display devices are used in utility locating equipment. Most of these displays are for single point location. The present invention is a display which is intended for use with systems that can deliver multiple target information. This makes possible the display of underground pipe branching. In addition, a variable resolution capability allows better tracing of close proximity.

BRIEF SUMMARY OF THE INVENTION

The vector positional display in accordance with the invention responds to a counter driven by a system reference clock with the accumulated count being indicative of position of a sensor array detector with respect to the underground object and to resolution decoders for the count by which different distance resolutions can be provided. The counter further responds to a data strobe signal such as a zero crossing detector by energizing one or more lights for indicating the position of one or more underground metals and pipes relative to the antenna array detector.

More particularly, the variable resolution vector position display comprises four subsystems. These include a display slot counter, a resolution multiplexer, a display decoder, and a multi pixel unit display. The display slot counter is a divide by n bit counter, where n is the number of stages required for the particular application resolution. The three most significant bits of the counter are used to synchronize external systems such as a signal sensor electronic switch. The input to the slot counter comes from a reference clock supplied by the system that the display unit is connected to. The output of the slot counter feeds a data buffer. The buffer isolates the resolution decoders to reduce loading effects on the slot counter outputs. The output of the data buffer feeds the inputs of the resolution decoders. The number of resolution decoders is dependent on the application. In the illustrative embodiment, three resolution decoders are used. The resolution decoders define the vector display output display resolution. For the example shown here the three resolution decoders are: times one (180°), times two (90°), and times four (45°). The resolution value for the decoder is determined by decoding different bit outputs from the slot counter. Outputs from the resolution decoders feed a multiplexer. The number of inputs on this multiplexer is determined by the number of output lines from the resolution-decoders, and the number of resolution decoders used in the system. The multiplexer allows the selection of the various resolutions. The output of the multiplexer feeds the main display decoder. This decoder converts the data from the resolution multiplexers to the data required for the display array. The display array can be made up of any type of visual display device. LEDs, LCDs, plasma, and vacuum fluorescent displays, can be handled by the system.

The invention and objects and features thereof will be more readily parent from the following detailed description and appended claims when taken with the drawings.

DESCRIPTION OF THE SPECIFIC EMBODIMENTS

Figure 5:
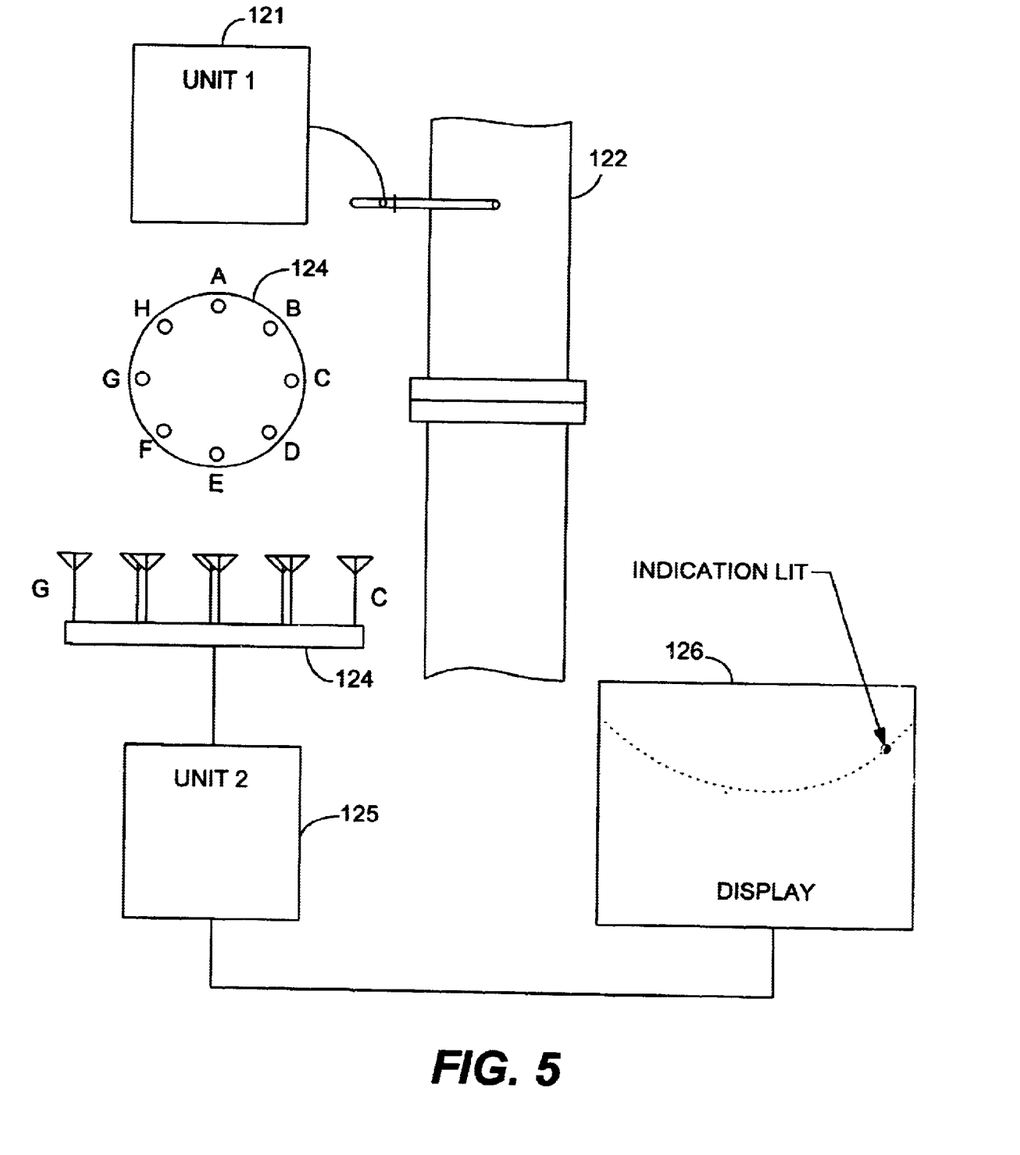
FIG. 5 is a visual representation of the vector display system with the signal sensor array to the left of the target pipe.
Figure 6:
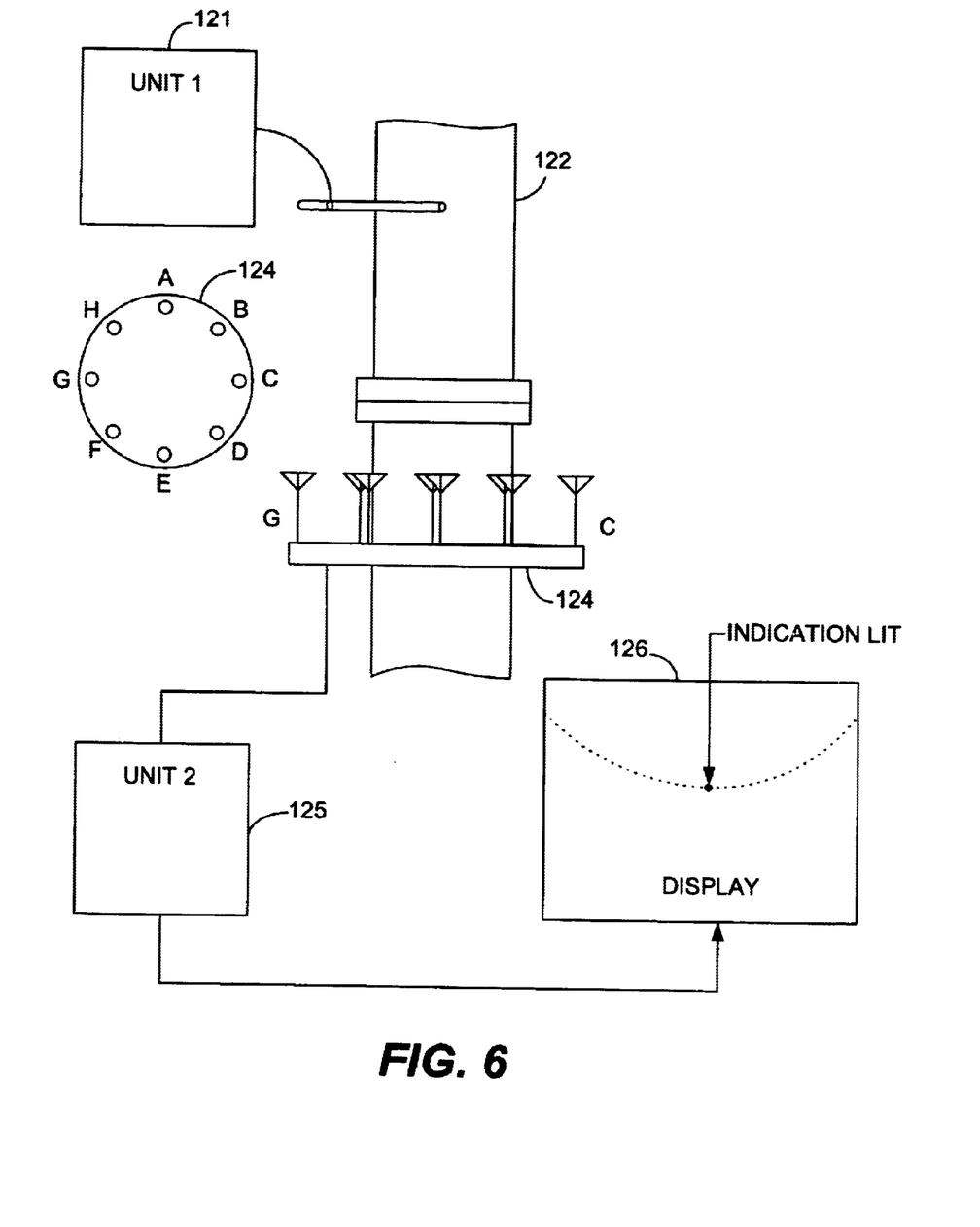
FIG. 6 is a visual representation of the vector display system with the signal sensor: array directly over the target pipe.
Figure 7:
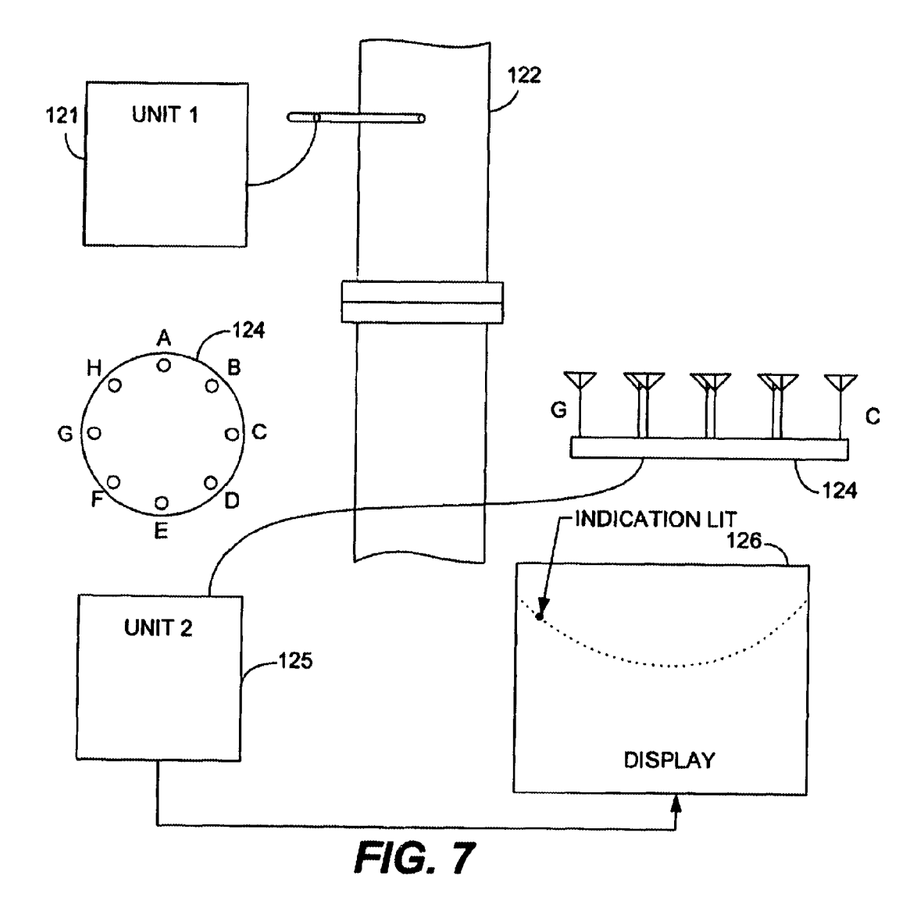
FIG. 7 is a visual representation of the vector display system with the signal sensor array to the right of the target pipe.

The invention is useful with various underground object locating systems, such as the system disclosed in application Ser. No. 09/948,519, supra. As shown in FIGS. 5–7, this system includes a transmitter section 121 for applying an RF signal to a metal or underground pipe 122 which then acts as a transmitter, and a receiver section including a sequentially activated antenna array 124 with each antenna of the array capable of detecting the transmitted signal. The antenna array 124 effectively frequency modulates the detected signal depending on orientation of the object from the array.

More particularly, the transmitter section 121 comprises a radio frequency oscillator and a radio frequency power amplifier. The output of the radio frequency power amplifier is connected to an impedance matching network. This network is used to turn the pipe or metal being driven into a loss line transmission radiator.

The receiver section 125 includes an array of signal sensors or antenna elements 124. This array can be any number of elements in size. The signal sensor elements are selected by an electronic sensor selection switch. The output of this switch feeds an FM receiver. The output of the FM receiver feeds a lowpass filter and a high Q bandpass filter. These can be switched capacitor filters and their clock frequencies are synchronized with the signal sensor selection clock. The output of the bandpass filter feeds a negative slope zero crossing detector. A zero crossing corresponds to an antenna pair parallel to and coplanar with the radiating pipe. A negative slope zero crossing detector outputs a pulse on each negative going zero crossing at its input. The output of the negative slope zero crossing detector feeds an adjustable delay line. The adjustable delay line corrects timing errors in the system. The output of the delay line feeds the vector display unit. A master clock generator synchronizes all circuits and provides a reference clock for the vector display unit.

The signal sensor elements must all be the same type. A four element signal sensor array consists of identical sensor elements placed at the end of a symmetrical cross. The eight element signal sensor array has 8 identical sensor elements placed in a circular fashion. The sensor elements for either array are selected in by an electronic switch. The action of the switch is the equivalent to mechanically rotating a single sensor element. The output from the signal sensor selector switch feeds an FM receiver. The output of the FM receiver is a series of audio pulses, each one corresponding to a sensor element of the signal sensor array during electronic selection. The output signal is fed to a filter system which converts the pulses to an analog signal and cleans the signal before being the applied to the high Q bandpass filter. The high Q bandpass filter has a clock signal that is synchronized to the switching control signal of the signal sensor array electronic switch. This synchronization provides consistent data to the negative slope zero crossing detector. The negative slope zero crossing detector accurately detects the frequency shift of the signal caused by the Doppler shift in the signal sensor array. This is done by measuring the shift in the negative slope zero crossing detector against the reference of the clock system. To synchronize the timing and make up for delays in the system, an adjustable delay line is inserted between the output of the negative slope zero crossing detector and the vector display unit. This delay line allows the positional calibration of the vector display unit. Each light of the vector display corresponds to a positional vector and to a detected zero crossing.

When the signal sensor array is to the left of the target pipe 122 in FIG. 5, the vector display 126 indicates how far to the left the signal sensor is. As the signal sensor array is moved over the target as in FIG. 6, the position of the target on the display will change with the position of the array over the target and the position of the detected zero crossing. In FIG. 7, the sensor array is to the right of the target pipe. As previously stated, the commutation of the electronic sensor switch is equivalent to physically rotating a single signal sensor element at high-speed. The Doppler effect of this rotation is the detected frequency at the output of the FM receiver. The zero crossing of the detected frequency at the output of the negative slope zero crossing detector, accurately defines the position of the target. This information is displayed on the vector positional display 126.

Figure 1:
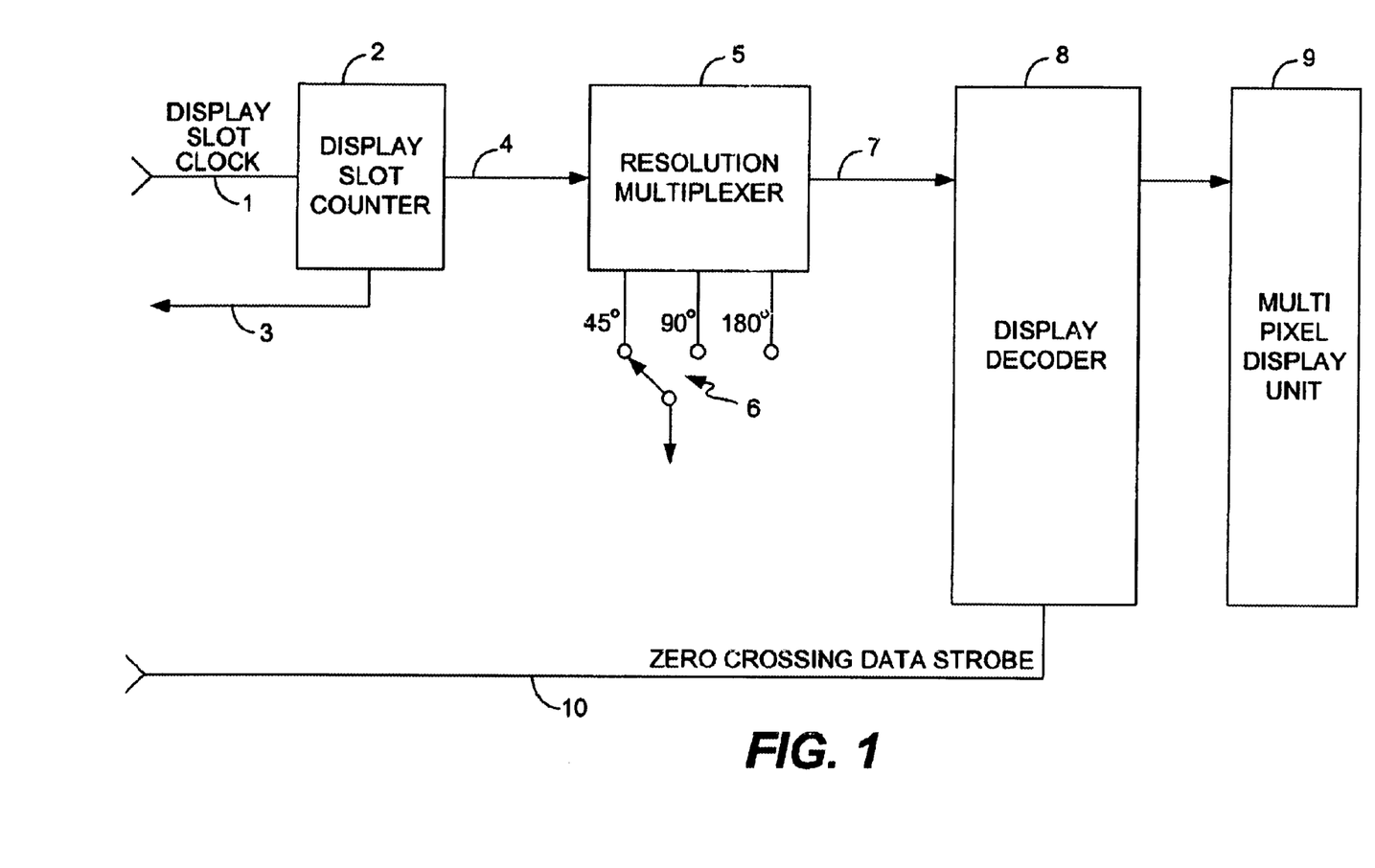
FIG. 1 is a block diagram of the variable resolution visual vector display unit in accordance with the invention.

The positional display invention comprises four subsystems. FIG. 1 is a block diagram of the overall system. The first subsystem is the display slot counter 2 which provides a position count, as interpreted by resolution decoders. This counter gets its input from the display reference clock 1 which drives the detecting antenna array and feeds its output 4 to the resolution multiplexer 5. In addition, the display slot counter has a synchronized output 3 that can be used to drive external systems such as a signal sensor commutating switch. The resolution multiplexer 5 has a selector switch 6, which is used to select the desired display resolution, for example, within a field of viewing 450°, 90°, or 180° with respect to the detecting antenna array. Switch 6 can be a mechanical or electronic device. The output 7 of the resolution multiplexer 5 feeds the display decoder 8. The data strobe 10 also feeds the display decoder 8. Through the display decoder 8 the signals form the proper format data for the multi pixel display unit 9. The type of display decoder 8 is selected based on the type of display unit 9 to be used.

Figure 2:
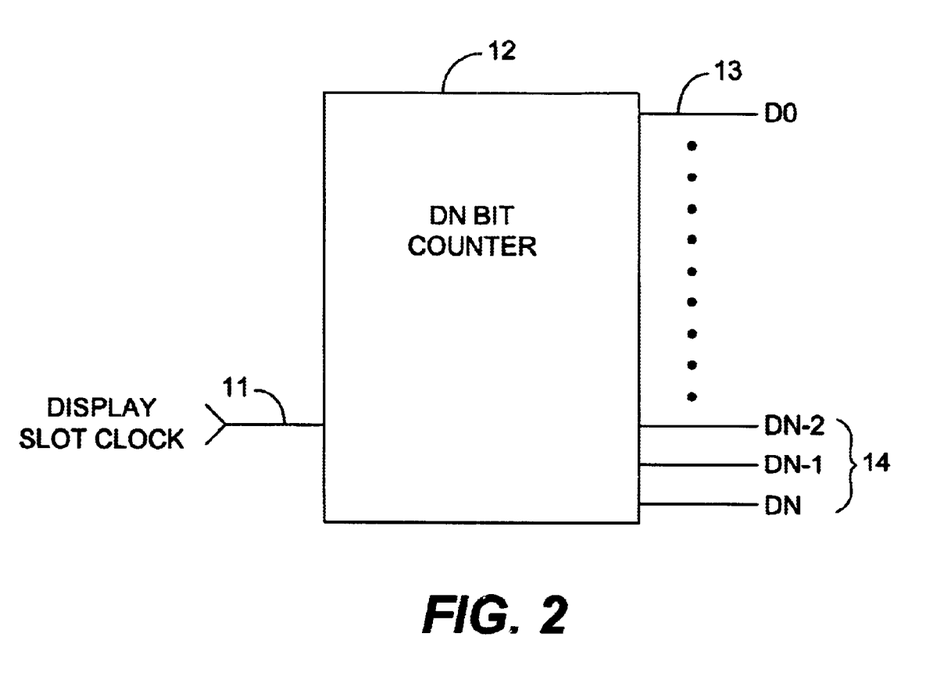
FIG. 2 is a block diagram of the n bit slot counter in the unit.

FIG. 2 shows the n bit slot counter 12. This counter 12 receives clock 11 and provides the reference data for the rest of the display. The output lines 13, DO through Dn, represent all the reference data required for the system. The length of the slot counter 12 is determined by the number of pixels in the display. The most significant bits 14 can be used to synchronize other parts of the system driving the display.

Figure 3:
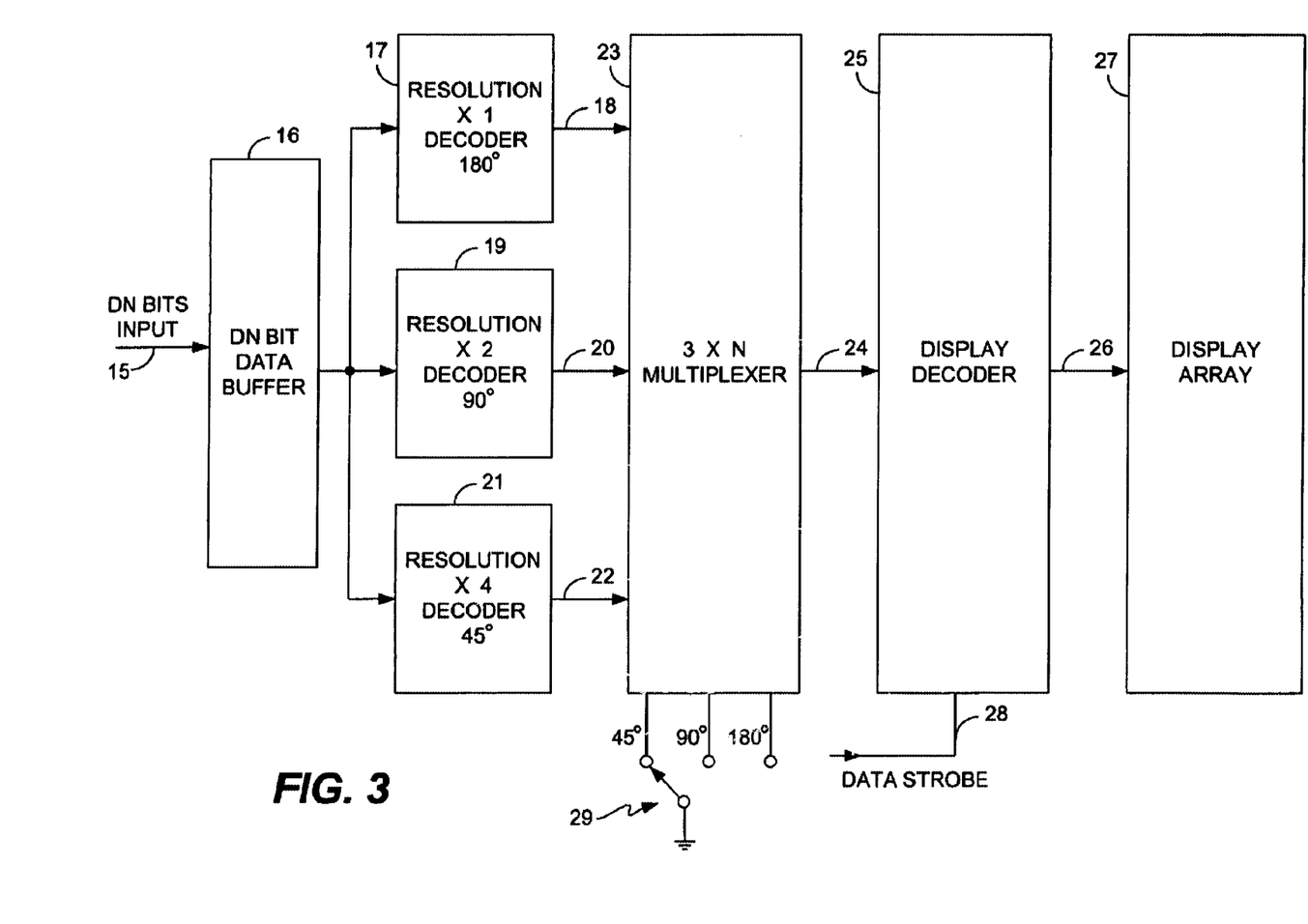
FIG. 3 is a block diagram of the data buffer, resolution decoders, multiplexer, display decoder, and multi pixel display in the unit.
Figure 4:
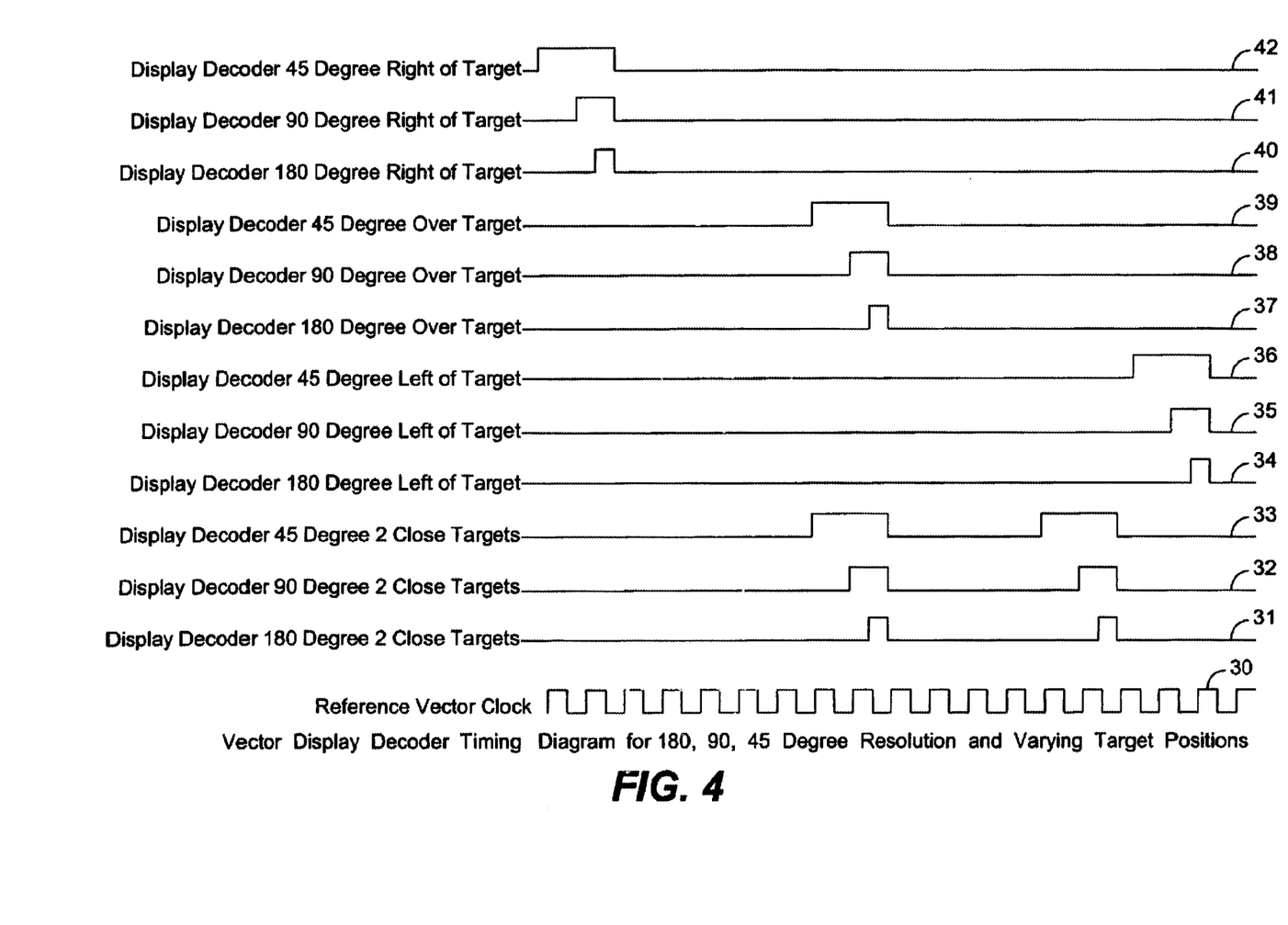
FIG. 4 is the vector display decoder timing diagram.

FIG. 3 is a block diagram of the rest of the display system. The data from the slot counter 12, FIG. 2, feeds the input 15 of the data buffer 16. The data buffer 16 insures that the timing for all data bits is not affected by input loading from the resolution decoders 17,19, and 21. In this example there are three resolution decoders. There is a times one decoder 17 (180°), a times two decoder 19 (90°), and a times four decoder 21 (45°). These decoders 17, 19, 21 decode the appropriate bits for the desired resolution of that decoder. The outputs 18, 20, 22 of the resolution decoders 17, 19, 21, feed the multiplexer 30 23. The multiplexer 23 selects the output 18, 20, 22 of the appropriate resolution decoder 17, 19, 21. The selector switch 29 determines the resolution selection. The output 24 of the multiplexer 23 feeds the display decoder 25. The display decoder 25 is also fed by the zero crossing data strobe signal 28 from the system driving the display, as described in application Ser. No. 09/948,519, supra. The display decoder 25 is designed to convert the binary signals from the selected resolution decoder 17,19,21 to the appropriate light activation signals required by the display array 27.;

FIG. 4 is the vector display decoder timing diagram for 180, 90, and 45 degree resolutions used in this embodiment as well as the varying target positions for these resolutions. The reference vector clock 30 is at the bottom of the timing diagram. Thirty two cycles of the reference vector clock 30 are shown. Timing lines 34, 35, 36, 37, 38, 39, 40, 41, and 42, show single target responses for positions to the left, directly over, to the right of the target area. They also show the target responses for the various resolutions. Timing lines 31, 32, and 33, show target responses for two close proximity targets. The target responses for various resolutions are also shown here. The number of lights that are lit depends on the number of zero crossings that occur during the pulse for each field of view and position., Thus, the display decoder receives the accumulated count of counter 2, as resolved by decoders 17, 19, 21 and applied through multiplexer 23, and in response to the zero crossing strobe energizes one or more lights of display 27. The energized lights indicate relative position of the metal or pipe to the sensor array.

While the invention has been described with respect to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A positional display for use with an underground object locating system comprising:
    a) a display having a plurality of lights indicating relative position of an object with reference to an antenna array,
    b) a display slot counter driven by a clock signal which drives the antenna array,
    c) first connector apparatus for coupling the count of the display slot counter, the first connector apparatus including object angle resolution decoders and a multiplexer for selecting resolution,
    d) a display decoder coupled to the first connector apparatus for receiving and converting the coupled count to a display compatible signal for energizing one or more lights, and
    e) a data strobe signal line for applying a strobe signal to the display for light activation depending on the display compatible signal.

2. The display as defined by claim 1 wherein the clock signal is indicative of antenna sequential activation relative to the antenna array.

3. The display as defined by claim 2 wherein the data strobe signal corresponds to a Doppler signal resulting from commutation of a signal detector sensor array, whereby count from the display slot counter provides a measure of angle from the antenna array to the underground object when the strobe signal is present.

4. The display as defined by claim 3 wherein the strobe signal is a zero crossing signal.

5. The display as defined by claim 1 wherein the data strobe signal corresponds to a Doppler signal resulting from commutation of a signal detector center array, whereby count from the display slot counter provides a measure of angle from the antenna array to an underground pipe when the strobe signal is present.

6. The display as defined by claim 5 wherein the strobe signal is a zero crossing signal.

7. A method of activating a multiple light positional display for use with an underground object locating system comprising the steps of:
    a) providing a first signal which sequentially indicates a direction to an object, the direction range of the first signal being variable for direction resolution,
    b) providing a second signal which indicates a reference with respect to the first signal, and
    c) activating a light in the display as determined by the first signal when the second signal is present.

8. The method as defined by claim 7 wherein the first signal is based on activation of an antenna array, and the second signal is based on a zero crossing detector of a signal from an FM receiver.

* * * * *